AUTOMATIC INFORMATION TRANSMISSION

Filed Dec. 29, 1955 4 Sheets-Sheet 1

INVENTOR
CURTIS HILLYER
BY Campbell, Brumbaugh, Free & Graves
HIS ATTORNEYS

Dec. 22, 1959 C. HILLYER 2,918,654

AUTOMATIC INFORMATION TRANSMISSION

Filed Dec. 29, 1955 4 Sheets-Sheet 2

INVENTOR
CURTIS HILLYER
BY
Campbell, Brumbaugh, Free & Graves
HIS ATTORNEYS

INVENTOR
CURTIS HILLYER
BY Campbell, Brumbaugh, Free & Graves
HIS ATTORNEYS

Dec. 22, 1959 C. HILLYER 2,918,654

AUTOMATIC INFORMATION TRANSMISSION

Filed Dec. 29, 1955 4 Sheets-Sheet 4

INVENTOR
CURTIS HILLYER
BY Campbell, Brumbaugh, Free & Graves
HIS ATTORNEYS

United States Patent Office 2,918,654

Patented Dec. 22, 1959

2,918,654

AUTOMATIC INFORMATION TRANSMISSION

Curtis Hillyer, Short Hills, N.J., assignor, by mesne assignments, to Stromberg Time Corporation, Thomaston, Conn., a corporation of Delaware Application December 29, 1955, Serial No. 556,120

11 Claims. (Cl. 340—150)

The present invention relates to the automatic transmission and collation of information and, more particularly, to novel methods and apparatus providing an information link between multiple, widely scattered transaction points and a central data-processing office.

A wide variety of data-processing equipment is currently being used and developed by many business concerns. Much of this equipment is of a high speed character, such as electronic computers, wherein a wide variety of information is collated and processed for use as business records, etc. An extremely important drawback to the continued development of the present types of computer equipment being used is that a large amount of paper work and clerical operations are involved in providing the necessary input information to the computers.

The present invention is directed to novel apparatus and techniques for substantially reducing the paper work and clerical operations in the pre-input stage of a complete data-processing system.

In accordance with the invention, a system is provided which consists of multiple, remotely operated transaction transmitting stations, hereinafter called transmitters, and a central receiving and recording station. As many as 50 transmitters, for example, may be connected to one receiver station. Data is automatically transmitted from the transmitters to the receiver station in the form of a standard "common language" code, which can then, at the receiver, be punched on tape suitable for immediate use in automatic typewriters, punched tape-to-punched card converters, or electronic data-processing systems.

In the preferred embodiment of the invention, the information transmitted from the individual transmitters may comprise station identification data, information as to whether the transaction is an increase or decrease in inventory, identification data identifying the worker or the manufacturing unit responsible for the transaction, job identification data and other variable data such as information indicating the number of units involved in the transaction. Part of this information, for example, the station identification data, can be of a fixed type, which is always transmitted for each operation of the individual transmitter, thereby identifying the source of the material to the receiver unit. Other information, such as the increase or decrease in inventory, or the variable data representing the number of units involved in the transaction, for example, can be set by manually operable selector switches accessibly mounted on the transmitter equipment. Still other information, such as the identification data relating to the worker or manufacturing unit performing the operation, and the identification of the job or character of the operation can be prerecorded on permanent or semi-permanent transaction description cards, which may be metal, plastic or paper. These cards can be selected and inserted into the transmitter unit by the worker performing the transmitting operation.

Only a small portion of the cards, for example, a ⅞" strip in the margin of the card, need contain the coded information. The remainder of the card, for example, both the front and the back of the card, may contain useful written transaction description and instructions facilitating the selection of the card by the worker. In that way, while the worker selects the card based on this written information, he in no way is responsible for the coded information transmitted by the transmitter to the receiver unit after the card has been inserted. In that way, the possibility of human error is tremendously lessened. The coded information on the job card, for example, may contain as many as 70 alpha-numeric characters of a common language code relating to the job or transaction. Similarly, the identification card, for example, may contain up to 15 alpha-numeric characters of a common language code and may serve as an identification pass or badge, or for item identification.

For a more complete understanding of the invention, reference may be had to the following detailed description taken in conjunction with the accompanying figures of the drawings, in which.

Figure 1:
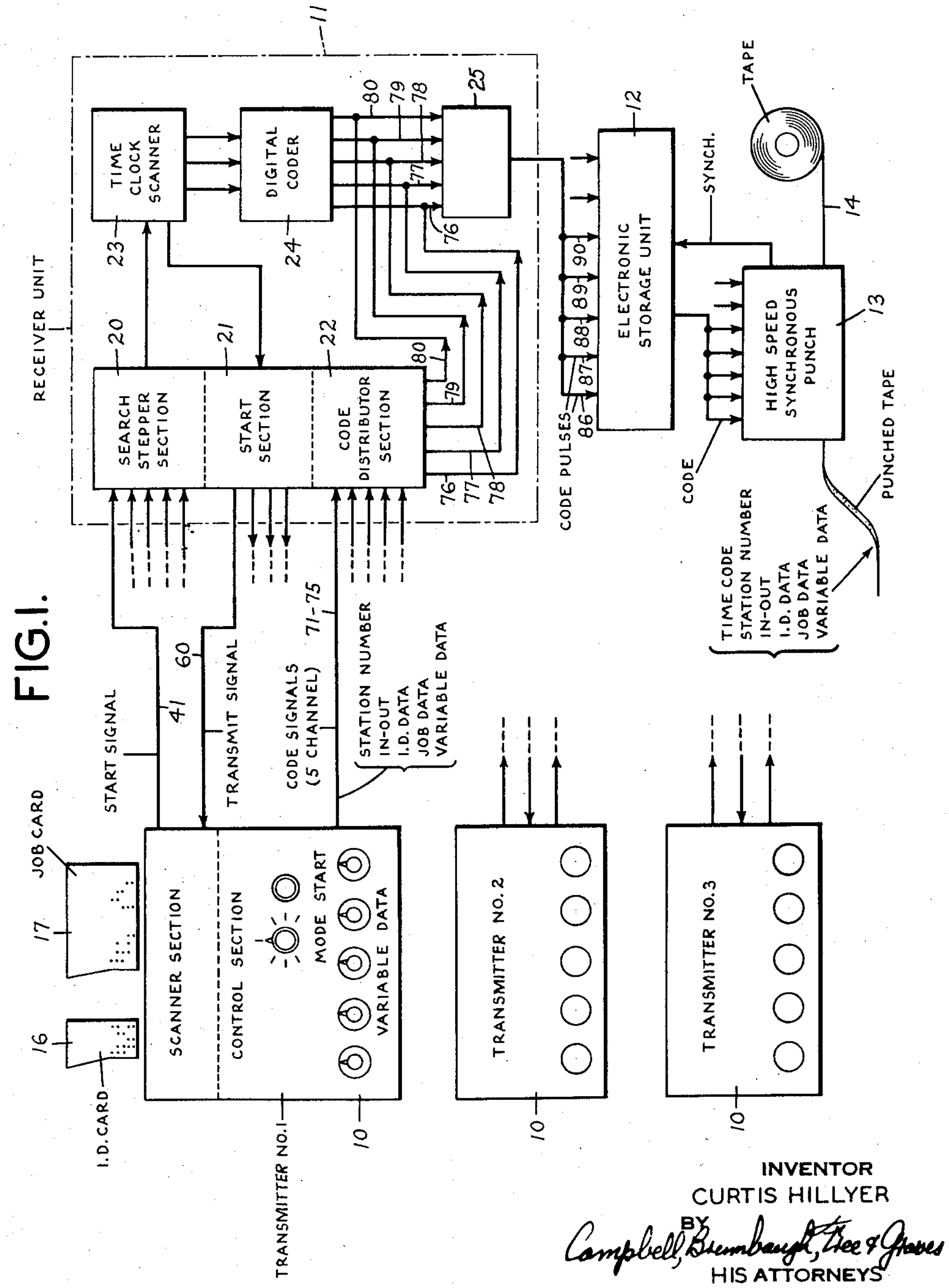
Figure 1 is a block diagram of an exemplary form of an overall system, in accordance with the present invention.
Figures 3, 4:
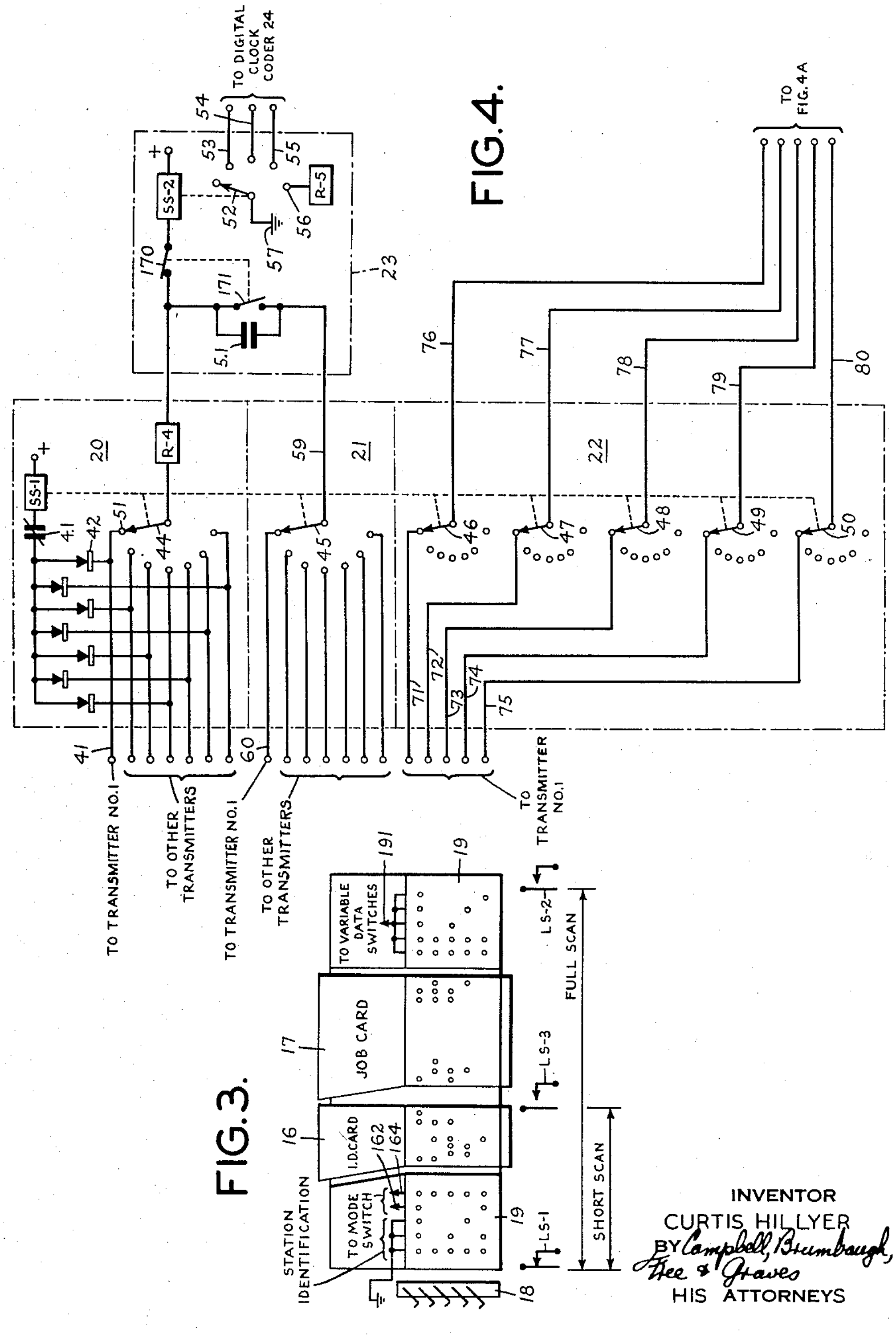
Fig. 3 is an exemplary representation of the data scanning apparatus of the transmitter.
Figs. 4 and 4A are detailed electrical schematic diagrams showing an exemplary form of the details of the components of the receiver unit in Fig. 1.

In Fig. 1, a plurality of transmitter units 10 are shown connected to a receiver unit 11, which is in turn connected through an electronic storage unit 12 to a high speed synchronous punch 13 adapted to operate in a conventional manner to punch common language code information on a tape 14. The electronic storage unit 12 and the high speed synchronous punch 13 may be standard teletype equipment, such as that manufactured by the Teletype Corporation as a Type BCU1 Control Unit for the 3600 O.P.M. tape punch. The transmitters 10 may comprise a scanner section and a control section. The scanner section is designed to receive selectable, preformed, coded information bearing means, such as the ID card 16 and a job card 17 (Fig. 3). A number of manually adjustable controls are accessibly mounted on the face of the panel of the control section of the transmitter 10 and in the preferred embodiment consist of rotary type variable data switches, a rotary type "mode" selector switch, and a manually depressible start button.

The receiving unit 11 includes a switching mechanism having a search stepper section 20, a start section 21 and a code distributor section 22. Also included in the receiver unit 11 is a time clock scanner 23, a digital coder 24 and an output unit 25.

The scanner section of the transmitter 10, in Fig. 3, includes a longitudinally extending carrier in which are located a plurality of electrical contacts in horizontal rows adapted to be passed over by a brush unit 18 having a plurality of brushes corresponding to the number of horizontal rows. In the preferred embodiment, the five horizontal rows of contacts are either embedded in or mounted on block 19, composed preferably of insulating material, and are aligned in vertical columns. The insulation block 19 has grooves or slots therein adapted to receive the cards 16 and 17, which as shown in Fig. 3 are of irregular shapes permitting the cards to be positioned in only one predetermined manner, relative to insulation block 19 so as to properly align the horizontal rows of contacts on the code bearing portions of the cards with the horizontal rows of contacts mounted directly on or in the insulation block 19. In the preferred embodiment, the cards 16 and 17 may be formed of a conductive metal such as copper with the coded portion of the cards consisting of a punched paper or plastic strip having good electrical insulating qualities and a smooth surface resistant to wear from the rubbing contact of the brushes of the brush unit 18.

Reading from left to right in Fig. 3, the vertical rows of coded contacts are grouped in specific information groups as follows: the first three rows are permanently grounded and represent a fixed specific station identification code for the particular transmitter unit, the next two columns of contacts are respectively representative of information such as an increase or a decrease in stock inventory resulting from the particular transaction, and the contacts of the five columns on the right hand side of the block 19 are individually connected to the manually adjustable variable data switches.

Figure 2:
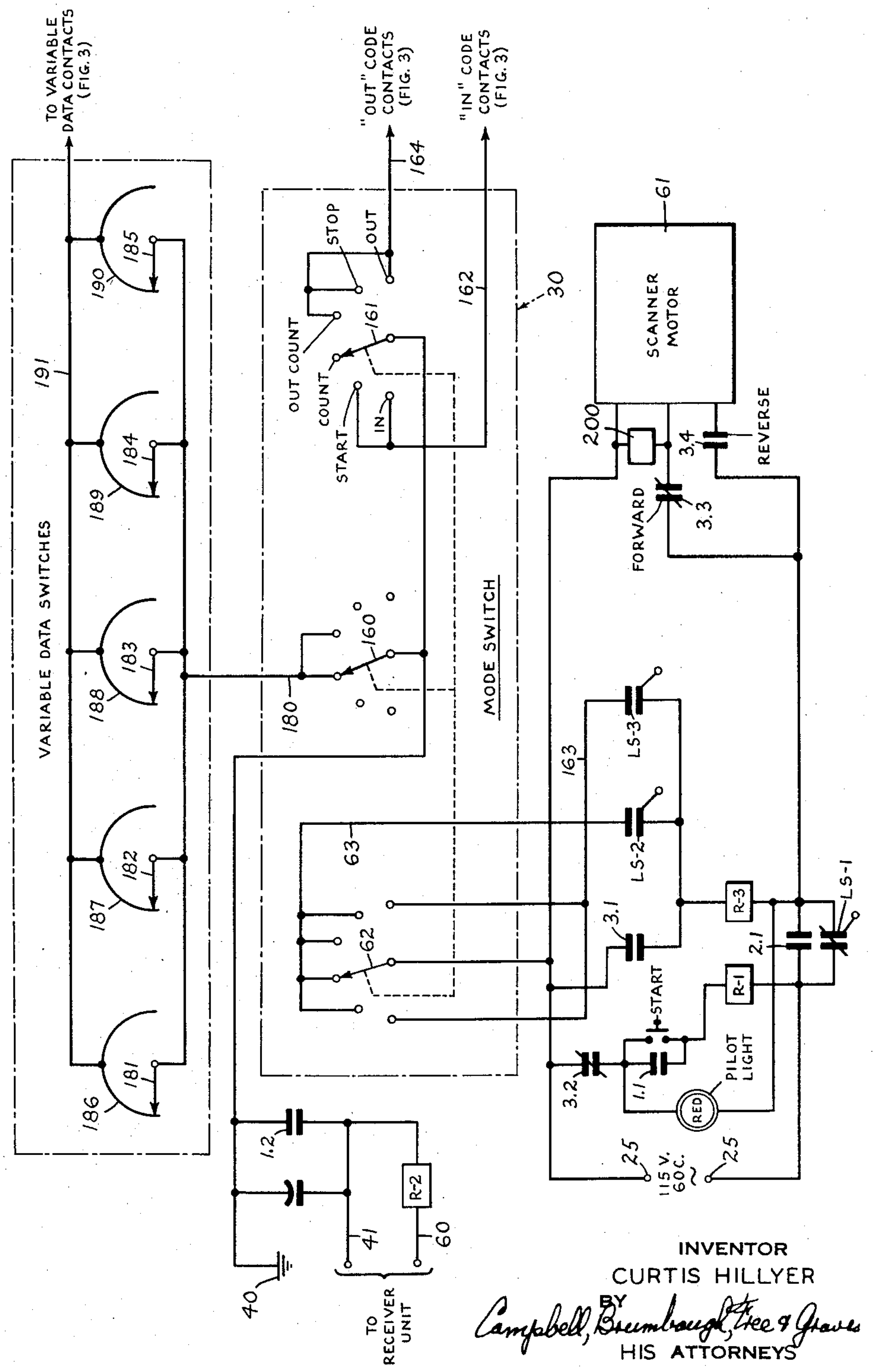
Fig. 2 is an electrical schematic diagram of an exemplary form of transmitter unit.
Figure 4A:
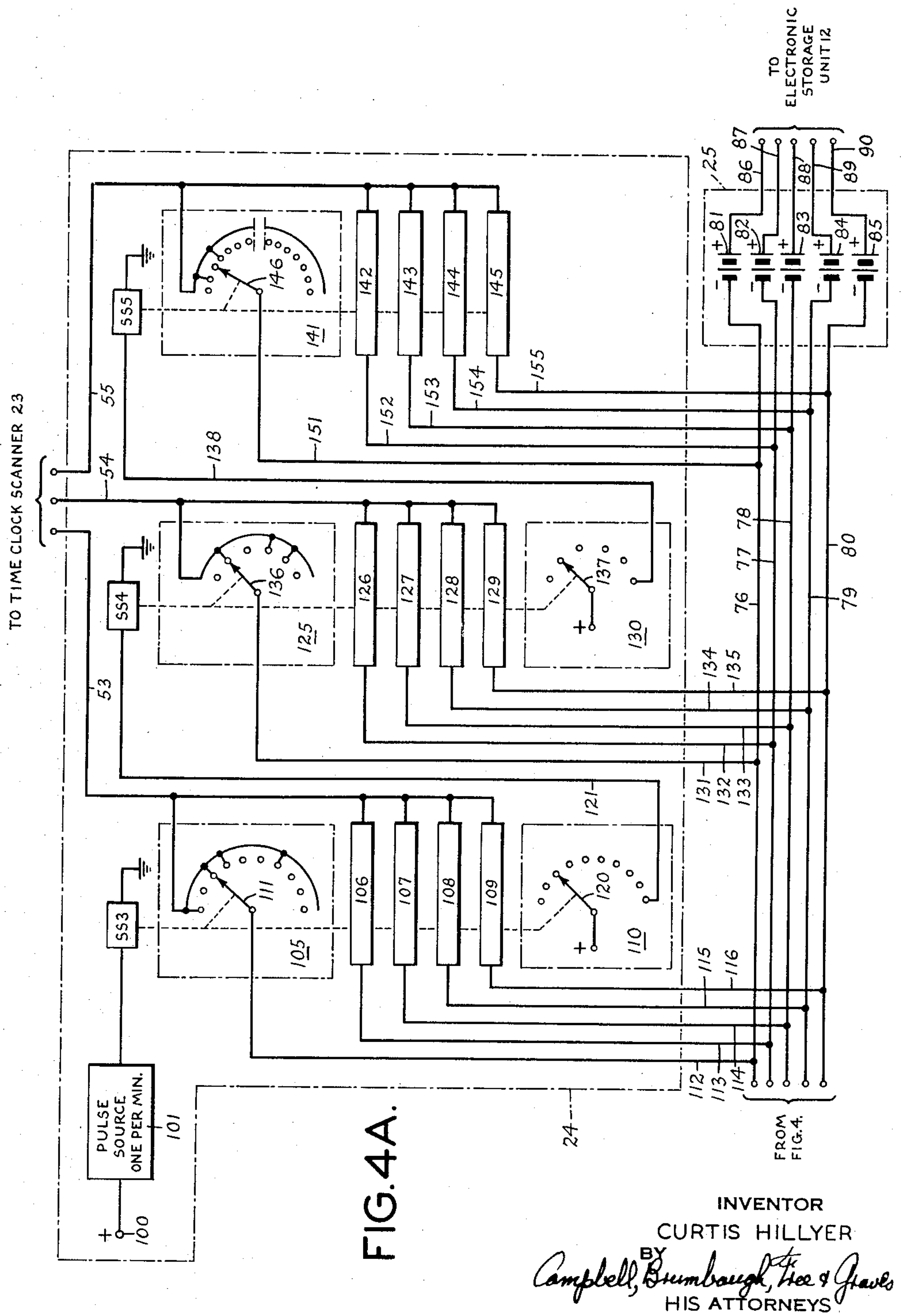

The detailed circuitry of the exemplary embodiment of the system, shown in Figs. 2, 4 and 4A, will now be discussed with reference to an assumed operation of the system. As shown in Fig. 2, a transmitter 10 may include a mode switch 30 of the rotary selector type having three levels and six positions on each level, for performing, in the preferred embodiment, six different operations as shown by the following table and by the legend in Fig. 2. In some modes of operation, the scanning action traverses all of the contacts on the insulation block 19 in what is known as a "full" scan. In other operations, the brush unit 18 traverses only a portion of the contacts of the insulation block 19 in what is known as a "short" scan. The short scan includes the station identification contacts, the In and Out contacts, and the ID card contacts. The variable data switch contacts are energized selectively in only some of the operating modes. Similarly, in some of the operating modes, the In code contacts are energized, in other modes of operation the Out code contacts are energized, and in still other modes of operation, neither the In nor the Out contacts are energized.

| Mode | Scan | Var. Data | In-Out |
|---|---|---|---|
| In | Short | | In. |
| Start | Full | | Do. |
| Count | do | Sent | |
| Out Count | do | do | Out. |
| Stop | do | | Do. |
| Out | Short | | Do. |

In the drawings, all relay contacts are shown in the position they would assume with their respective relays deenergized. Also, all relays are designated by the letter R, e.g., R–1, and their contacts are designated by the relay number followed by the contact number, e.g., 1.1.

In describing the operation, let us first assume that the mode switch is in the "Count" position, as shown in Fig. 2, and that an ID card 16 and a job card 17 have been selected and have been inserted into the slots of the insulation block 19 of the scanning section of the transmitter. Also, let us assume that the five variable data switches have been set so as to be representative of some specific information, such as, the total number of units involved in the transaction. The operator now presses the start button, energizing a relay R–1 through a normally closed contact 3.2 connecting the relay to a suitable electrical supply source 25, such as 115 volt, 60 cycle, alternating current. The relay R–1 picks up and seals itself in by closing a normally open contact 1.1, which is in parallel with the start button. The relay R–1 also operates to close a normally open contact 1.2, thereby connecting the system ground 40 to an electrical conductor 41 leading to the receiver unit.

The conducting means 41 is connected to the search stepper section 20 of the receiver unit and, as shown in Fig. 4, connects the system ground 40 through a uni-directional conducting means 42, for example, a rectifying element, and a normally closed contact 4.1 to a stepping switch solenoid SS1 thereby energizing the stepping switch in a conventional manner. The uni-directional conducting means 42 effectively isolate the conducting means 41 of the individual transmitters.

The stepping switch SS1, in the preferred embodiment, has seven levels. The first one of the levels having a rotatable contact arm 44 is located in the search stepper section 20. A second one of the levels having a rotatable contact arm 45 is located in the start section 21. Five other levels having contact arms 46, 47, 48, 49 and 50 are located in the code distributor section 22. As soon as the stepping switch SS1 is energized, the rotatable contact arm 44 starts to step through a plurality of contacts 51 connected respectively to the lines 41 from the transmitters. As soon as the rotatable contact arm 44 contacts the respective contact 51 associated with the conducting means 41 of the transmitter for which the start button has been pressed, in this case transmitter No. 1, the relay R–4 of the search stepper section 20 and the stepping switch solenoid SS2 in the time clock scanner section 23 are connected to the system ground 40 and are energized. This causes the relay R–4 to pick up and open the normally closed contact 4.1 in the energizing circuit for the stepping switch SS1. When that occurs, the stepping switch SS1 is rendered unresponsive to start signals from any of the other transmitters of the system.

As soon as the stepping switch solenoid SS2 is energized, its rotatable contact arm 52 starts to step around a plurality of conducting means 53, 54, 55 and 56. The conducting means 53, 54 and 55 are connected to the digital clock coder 24 in Fig. 4A and energize respective sections of the clock code by connecting a ground 57 thereto, so as to cause a time signal to be transmitted through the output means 25 to the electronic storage unit 12, as will be described in detail hereinafter.

After the time signal has been supplied to the electronic storage unit 12, the rotatable contact arm 52 contacts the conducting means 56 causing the ground 57 to be connected to the relay R–5, thereby energizing that relay. When the relay R–5 picks up, a normally open contact 5.1 is closed. When the contact 5.1 closes, a positive voltage is applied to the conducting means 59 and the relay R–2 (Fig. 2) is energized through the rotatable contact arm 45 of the second level of the stepping switch SS1, in the start section 21 a conducting means 60, leading to the transmitter No. 1, the relay R–2, the now closed contact 1.2 and the system ground 40. Thus a transmit signal is sent from the receiver unit to the transmitter.

When the relay R–2 picks up, a contact 2.1 closes, energizing a scanner motor 61 by means of the alternating current voltage source 25 through the normally closed contact 3.3. This causes the scanner motor to drive the brush unit 18 across the contacts on the insulation block 19 (Fig. 3). The scanner motor 61 can take any suitable form such as a conventional type of reversible synchronous or induction motor.

A normally closed limit switch contact LS–1 bridges the contact 2.1. As seen in Figure 3, the limit switch contact LS–1 is at the extreme left traverse of the insulation block 19. When the brush unit 18 is in its far left hand position, the limit switch contact LS–1 is open. Therefore, the scanner motor 61 cannot be energized until the relay R–2 picks up in response to the transmit signal from the receiver unit. However, once the brush unit 18 starts to move to the right across the insulation block 19, the limit switch LS–1 returns to its normally closed position, thereby maintaining the energizing path for the scanner motor 61 until the brush unit 18 returns to its initial position.

In the assumed mode of operation, with the mode switch in the Count position, the short scan limit switch LS–3 is disabled because a rotatable contact arm 62 of the left hand level of the mode switch 30 is not in electrical contact therewith. However, the full scan limit switch LS–2 is enabled, since the rotatable contact arm 62 is in contact with one of the contacts connected to the conducting means 63 leading thereto. Therefore, when the brush unit 18 has completed a full scan of insulation block 19, it contacts and closes the limit switch LS–2, and the relay R–3 is energized by the source 25 through the rotatable contact arms 62 of the mode switch, conducting means 63, the now closed limit switch LS–2, the relay R–3 and the parallel closed contacts 2.1 and LS–1. When the relay R–3 picks up, a normally open contact 3.1 closes, sealing the relay R–3 in its energized condition. Also, a normally closed contact 3.2 opens causing the relay R–1 to fall out, thereby opening the contact 1.2 connecting the transmitter to the receiver unit. When the contact 1.2 opens, the relay R–2 which is connected to the receiver unit by the conducting means 60 falls out opening the contact 2.1. However, this produces no effective change in the operation of the transmitter, since the contact 2.1 is bridged by the now closed limit switch contact LS–1 which will remain closed until the brush unit 18 has returned to its full left traverse. Thus the energizing circuit for the scanner motor 61 is maintained enabled. However, the direction of operation of the scanner motor 61 is changed when the relay R–3 picks up, because the normally closed contact 3.3 in the forward control circuit for the scanner motor 61 opens and the normally open contact 3.4 in the reverse control circuit for the scanner motor 61 closes, thereby returning the brush unit 18 to the full left traverse.

In order to advise the person operating the transmitter, that the transmitter is operating and is in its transmitting cycle, a red pilot light is bridged between the normally closed contact 3.2 and the normally open contact 2.1, in such a manner that the pilot light becomes illuminated when the relay R–2 picks up advising the operator that the transmitter unit is going to transmit to the receiver unit. It is noted that this does not occur merely at the time that the operator presses the start button. Therefore, if some other transmitter is transmitting to the receiver unit, the relay R–2 will not pick up and the pilot light is not illuminated. However, as soon as the transmitter unit is given its transmit signal, the relay R–2 picks up and closes the contact 2.1, energizing and illuminating the red pilot light. This occurs at the same time that the scanner motor 61 starts to drive the brush unit 18 from its full left traverse on its forward movement scanning the various information contacts.

As soon as the scanning traverse is finished, i.e., the brush unit 18 contacts either the limit switch LS–2 or LS–3, whichever one is selected, the relay R–3 picks up and the red pilot light is extinguished, advising the operator that the transmission is completed and that the cards 16 and 17 may be removed. At the same time, the transmitter unit is disconnected from the receiver unit, thus deenergizing the relay R–4 and the stepping switch solenoid SS2. When the relay R–4 (Fig. 4) falls out, the contact 4.1 is restored to its normally closed condition and the stepping switch solenoid SS1 is enabled to be energized by another transmitter for which a start signal has been registered.

As for the stepping switch solenoid SS2, it is returned in a conventional manner to its starting position, shown in Fig. 4, thereby enabling it to cause the transmission of a time signal at the beginning of the next transmission to the receiver unit. When the rotatable contact arm 52 of the stepping switch solenoid SS2 returns to its starting position, the relay R–5 drops out and opens a contact 5.1 in the conducting means 59, thereby preparing that specific circuitry for the next receiving operation.

As shown in Fig. 2, in the preferred embodiment, the variable data switches are enabled in the Count mode of operation by means of the rotatable contact arm 160 of a second level of the mode switch 30, which with the rotatable contact arm 161 of a third level of the switch 30 are ganged with the rotatable contact arm 62, connecting the system ground 40 through the conducting means 180 to the manually rotatable contact arms 181, 182, 183, 184 and 185 of the variable data switches. The contact arms 181, 182, 183, 184 and 185 are each adapted to selectively contact individual contacts, shown collectively at 186, 187, 188, 189 and 190, connected through the respective individual conductors of a conducting means 191 to the variable data switch contacts (Fig. 3) on the insulation block 19.

The five brushes of the brush unit 18 (Fig. 3) are respectively connected to five conducting means 71–75, inclusive, (Fig. 4) which lead from the respective transmitter unit to the code distributor section 22 of the receiver unit 11. The five conductors 71-75, inclusive, of each of the transmitter units are connected, respectively, to different ones of the five levels of the stepping switch SS1, having respective rotatable contact arms 46-50, inclusive. For example, the rotatable contact arm 46 of the code distributor section 22 is adapted to selectively contact the conducting means 71 of each of the transmitter units of the system, the rotatable contact arm 47 is adapted to selectively contact each of the respective conducting means 72 of the various transmitter units of the system, etc.

The output of the code distributor section 22 is taken from the contact arms 46–50, inclusive, by respective conducting means 76–80, inclusive. The conducting means 76–80 lead from the code distributor section 22 in Fig. 4 to the output means 25 in Fig. 4A and thence to the electronic storage unit 12.

The output means 25 may take any suitable form whereby the common language code signals to be transmitted from the individual transmitters 10 and the digital clock coder 24 are presented in the form of code pulses or signals to the electronic storage unit 12. In the preferred embodiment, the output means 25 comprises individual batteries 81–85, inclusive, which serve to energize the respective conducting means 76–80, inclusive, when one or more of the conducting means are grounded by the brushes of the brush unit 18 associated with each of the conducting means passing over and establishing electrical contact with the selectively grounded contacts on the insulation block 19. Conducting means 86–90 leading to the storage unit 12 are connected through the batteries 81–85 to the respective conducting means 76–80.

Thus, when the stepping switch solenoid SS1 is stepped around, in response to a start signal from a transmitter unit, the respective conducting means 71–75 inclusive, of the transmitter unit are selected by the rotatable contact arms 46–50, inclusive, of the code distributor section and the common language code output signals from the transmitter produced during the traverse of the brush unit 18 across the vertical columns of contacts on the insulation block 19 are transmitted through the code distributor section 22 and the output means 25 to the electronic storage unit 12, where they are stored and then fed to the high speed synchronous punch 13. The punch 13 is operated to provide common language code information on the punched tape 14 representative, for example, in the preferred embodiment of the time code, the station identification number, the In or Out characteristic of the transaction, the identification data of the transaction, the job data of the transaction and any variable data, such as a number of units involved in the transaction.

The digital coder 24 (Fig. 4A) comprises a potential source 100 connected through a timing pulse source 101 to a conventional stepping switch solenoid SS3 in such a manner as to cause the stepping switch SS3 continuously to step in constant, regularly occurring intervals of time, for example, one step per minute. The stepping switch SS3 has six levels, 105–110, inclusive. The levels 105–109, each include a rotatable contact arm 111 adapted to pass over and contact in a regular sequence ten different contacts, representative of one minute intervals in time. The rotatable contact arms 111 of the stepping switch levels 105–109 of the stepping switch SS3 are connected through respective conducting means 112–116, inclusive, to the conducting means 76–80, respectively. The conducting means 53 leading from the time clock scanner 23 in Fig. 4 is connected to different combinations of respective contacts in the stepping switch levels 105–109, in such a manner as to provide a common language code representation of each of the minute unit representations of time. Thus, when the rotatable contact arm 52 of the stepping switch SS2 in Fig. 4 contacts the conducting means 53, the ground 57 is connected to predetermined contacts in the stepping switch levels 105–109, causing the common language code representation of the particular minute unit of time to be transmitted through the output means 25 to the electronic storage unit 12.

The level 110 of the stepping switch SS3 has a rotatable contact arm 120, which steps around the first nine contacts of the first nine minute units and then contacts a conducting means 121 leading to a stepping switch solenoid SS4, after each ten steps taken by the stepping switch SS3. The stepping switch SS4 also has six levels. 125–130, inclusive. The stepping switch levels 125–129 are connected respectively through conducting means 131–135 to the conducting means 76–80. Each of the levels 125–129 has a rotatable contact arm 136 adapted to pass selectively over and contact six individual contacts representative of ten minute intervals of time. The conducting means 54 leading from the time clock scanner 23 is connected to respective ones of the contacts in each of the various levels 125–129 in a predetermined five unit common language code. Thus at each ten minute interval, the rotatable contact arm 120 of the level 110 of the stepping switch SS3 contacts the conducting means 121 energizing the stepping switch solenoid SS4 and causing the rotatable contact arms 136 of the levels 125–129 to step to the next ten minute interval contact. Therefore, when the rotatable contact arm 52 of the stepping switch solenoid SS2 in Fig. 4 contacts the conducting means 54, the ground 57 is connected through the conducting means 54, the selected contacts in the stepping switch levels 125–129 of the stepping switch SS4, and the conducting means 131–135 to the conducting means 76–80, and thence through the output means 25 and the conducting means 86–90 to the electronic storage unit 12. The coded signal transmitted thereby represents the particular ten minute interval of time at which a transmitter is transmitting.

The stepping switch level 130 of the stepping switch SS4 is similar to the level 110 of the stepping switch SS3, in that it provides an output at the end of each 60 minute interval when its rotatable contact arm 137 contacts the conducting means 138 leading to the stepping switch solenoid SS5. The stepping switch solenoid SS5 has and controls five stepping switch levels 141–145, inclusive. The rotatable contact arms 146 of each is respectively connected through conducting means 151–155, inclusive, to the conducting means 76–80. The rotatable contact arms 146 are adapted to pass selectively over and engage twenty-four individual contacts in each stepping switch level, representative of the twenty-four hours of the day. These contacts are respectively connected in a predetermined manner to the conducting means 55, leading to the time clock scanner 23. Thus, when the rotatable contact arm 52 of the stepping switch SS2 contacts the conducting means 55, the ground 57 is connected through the conducting means 55 to predetermined contacts in the levels 141–145 and through the conducting means 151–155 to the conducting means 76–80 so as to provide a five unit common language code representative of the particular hour of the day at which the transmitter is transmitting.

Thus, there has been provided a system whereby an unlimited variety of information can be transmitted from a remote transmitter unit to a central receiver unit for recording on a punch tape, wherein an operator at the transmitter unit need only select particular ones of previously prepared ID cards 16 and job cards 17, place them in the scanner section of the transmitter, select the particular mode of transmission, and press the start button.

In the above discussion of the operation of the system, it was assumed that the mode switch was set for Count operation. Briefly, the other modes of operation will operate in the following manner. First let us assume that the mode switch is set for the "In" operation.

In that case, the rotatable contact arms 62, 160 and 161 of the various mode switch levels would be in their furthest counterclockwise position. In that position, the rotatable contact arm 160 would rest on an empty contact and the variable data switches would not be enabled. The rotatable contact arm 161 will rest on a contact connected to the conducting means 162 connecting the system ground 40 to the "In" code contacts. The rotatable contact arm 62, meanwhile, is on a contact connected to the conducting means 163 leading to the limit switch LS–3. As seen in Figure 3, the limit switch contact LS–3 is positioned just after the ID card 16. Therefore, when the transmit signal is passed back over the contact 60 to the transmitter energizing the relay R–2 and causing the scanner motor 61 to drive or to start the traverse of the brush unit 18 across the insulation block 19, the system will act to transmit the station identification signals, "In" code contact signal and the common language code indications on the ID card 16. After completing the traverse of the ID card 16, the limit switch contacts LS–3 will be closed, thereby energizing the relay R–3 and causing the reversal of the scanner motor.

Now let us assume that the mode switch is positioned for the "Start" operation. In that case, the rotatable contact arms 62, 160, 161 will contact the second contact from the furthest counterclockwise position. In that position, the rotatable contact arm 161 is in contact with the conducting means 162 leading to the "In" code contacts, but the rotatable contact arm 160 still is not in contact with the variable data switches. As for the rotatable contact arm 62, it is in contact with the conducting means 63 leading to the limit switch LS–2. Therefore, when the brush unit 18 traverses the insulation block 19, the following information is transmitted: The station identification signal, the "In" code signal, and the common language code indications on both the ID card 16 and the job card 17. Then when the brush unit 18 has completed the traverse of insulation block 19, the limit switch contact LS–2 is closed, picking up the relay R–3 and causing the reversal of the scanner motor 61.

In the "Out Count" operation as selected by the mode switch, the variable data switches are connected to the system ground 40 through the rotatable contact arm 160, as in the Count operation, so that when the brush unit 18 traverses the contacts associated with the variable data switches on the insulation block 19, common language code indications are transmitted representative of that information. In fact, the operation is identical with that of the Count mode of operation discussed first with regard to the overall operation of the system, with the additional feature that the system ground 40 is connected through the contact arm 161 to the conducting means 164, thereby enabling the "Out" code contacts.

When the mode switch 30 is set for the "Stop" mode of operation, the brush unit 18 makes a complete traverse of the insulation block 19 because the rotatable contact arm 62 is in contact with the conducting means 63 leading to the limit switch contact LS-2. However, since the rotatable contact arm 160 is no longer in contact with the conducting means 180 leading to the variable data switches, no variable data switch information is transmitted. Otherwise, in the Stop mode of operation, the Out code indication is transmitted, since the rotatable contact arm 161 is in contact with the conducting means 164 leading to the "Out" code contacts.

As for the "Out" mode of operation, it will be seen from Figure 2, that an Out code indication will still be given, because the rotatable contact arm 161 is in contact with the conducting means 164. However, no variable data switch information will be transmitted, because the rotatable contact arm 160 is not in contact with the conducting means 180. Further, while the above operation is similar to that for the Stop mode of operation, the rotatable contact arm 62 is in contact with the conducting means 163, so that the limit switch contact LS-3 is controlling instead of the limit switch contact LS-2. Therefore, only the following information is transmitted: The station identification, the Out code indication, and the common language code indications on the ID card 16.

In each of the above discussed modes of operation, it has been assumed that an individual time code signal will be inserted just before the station number identification of the transmitter by means of the operation of the time clock scanner 23 and the digital coder 24. However, it may be desirable under some circumstances not to transmit the time code signal prior to the operation of each transmitter. In that case, a double-throw-single-pole switch having a normally closed contact 170 and a normally open contact 171 may be used to disconnect the stepping switch solenoid SS2 of the time clock scanner 23 and to bypass the contacts 5.1 of the relay R-5. Thus, when the start button on a transmitter is pressed, the start signal is transmitted over the connecting means 41 to the search stepper section 20. When the rotatable contact arm 44 has been stepped around by means of the stepping switch solenoid SS1 to contact the respective conducting means 41 of the particular transmitter unit, the conducting means 59 is directly connected through the switch contact 171, the relay R-4 and the rotatable contact arm 44 to the conducting means 41. Therefore, a transmit signal is returned to the transmitter, as soon as the transmitter is selected by the search stepper section 20 of the receiver unit.

In the preferred embodiment of the invention, it is also desirable to provide suitable protective means 200 adapted to prevent the insertion or removal of ID cards 16 and job cards 17 during the forward traverse of the brush unit 18 over the insulating block 19 when the transmitter is transmitting. The protective means 200 is connected across the forward motor control leads to the scanner motor 61 (Fig. 2).

Thus, there has been provided novel methods and apparatus by which a very substantial reduction in the amount of clerical and paper work operations necessary to transmit an unlimited variety of information from multiple transmitter units remotely situated from a central receiving unit and for collating the information in the form of a common language code punched tape, which is readily usable in modern electronic computers and other types of equipment is obtained.

It will be obvious to those skilled in the art, that the above-described embodiment is meant to be merely exemplary and that it is susceptible of modification and variation within the spirit and scope of the invention. For example, while the system has been described with regard to a common language code of five units, it will be obvious that special codes of a greater number of units, e.g., 7, could be used in the system. Further, while individual batteries 81-85 have been used in the output means 25, conventional pulse shaping circuits and pulse producing circuits could be substituted therefor. Also, conventional electronic circuits may be substituted for the electro-mechanical stepping switches. Therefore, the invention is not deemed to be limited except as defined by the following claims.

I claim:

1. A system for transmitting intelligence in coded form from a plurality of remote transmitting stations to a central receiving station, comprising means at each of said transmitting stations for registering and transmitting to said central receiving station a start signal, means at said central receiving station responsive to said start signal for selecting the transmitting station whose starting signal operated, means responsive to the selection of said transmitting station for transmitting a transmit signal from said central receiving station to said selected remote transmitting station, means at said remote transmitting station responsive to the reception of said transmit signal for scanning selectable, previously coded intelligence bearing means and for transmitting coded signals in response to such scanning, and means at said receiving station for receiving said previously coded signals transmitted from said transmitting station.

2. A system for transmitting intelligence from a plurality of remotely spaced transmitting stations to a central receiving station for common usage thereat, each of said transmitting stations comprising means adapted to scan selectable, coded information bearing means for transmitting coded signals to said receiving station and means for transmitting a start signal to said receiving station, said receiver station comprising means for selecting in response to said start signal the transmitting station transmitting said start signal, means responsive to the selection of said one of said transmitting stations for remotely causing said coded signal transmitting means in said selected transmitter to scan said information bearing means, and common means for receiving information transmitted from each of said selected transmitting stations.

3. A system for transmitting intelligence from a plurality of remotely spaced transmitting stations to a central receiving station for common usage thereat, each of said transmitting stations including means adapted to scan selectable, coded information bearing means for transmitting coded signals to said receiving station and means for transmitting a start signal to said receiving station, said receiving station comprising receiver means for receiving coded signals from said transmitter stations, first selecting means for selecting one of said plurality of transmitting stations and for energizing said scanning means thereat, second selecting means for causing said receiving means to be responsive to signals transmitted from said selected transmitting station, and means responsive to said start signals transmitted from said transmitting stations to control the operation of said first and second selecting means.

4. A system for transmitting intelligence from a plurality of remotely spaced transmitting stations to a central receiving station for common usage thereat, each of said transmitting stations including means adapted to scan selectable, coded information bearing means for transmitting coded signals to said receiving station and means for transmitting a start signal to said receiving station, said receiving station comprising receiver means for receiving coded information from each of said transmitting stations, recording means for making a record of said received coded information, and means responsive to start signals from said transmitting stations for controlling the operation of said receiver means and for initiating the operation of said scanning means in the selected one of said transmitting stations.

5. A system for transmitting intelligence from a plurality of remotely spaced transmitting stations to a central receiving station for common usage thereat, each of said transmitting stations including means operable to scan selectable, coded information bearing means for transmitting coded signals to said receiving station and means for transmitting a start signal to said receiving station, said receiver station comprising receiver means for selectively receiving coded signals from a selected one of said transmitting stations, output means connected to said receiver means, time coding means operable to provide a coded time signal to said output means, station selecting means responsive to said start signals transmitted from said transmitting stations for connecting a transmitting station transmitting a start signal to said receiver means and for operating said time coding means, and means responsive to the operation of said time coding means for initiating the operation of said scanning means at the selected transmitting station.

6. A system for transmitting intelligence from a plurality of remotely spaced transmitting stations to a central receiving station for common usage thereat, each of said transmitting stations including means operable to scan selectable, coded information bearing means for transmitting coded signals to said receiver station and means for transmitting a start signal to said receiver station, said receiver station comprising means for selectively receiving coded signals from a selected one of said transmitting stations, output means connected to said selective receiving means, continuously operating time coding means operable to provide coded time signals to said output means, station selecting means responsive to said start signals transmitted from said transmitter stations for controlling the operation of said selective receiving means and for causing coded time signals to be supplied to said output means by said time coding means, and means responsive to the operation of said time coding means for initiating the operation of said scanning means of said selected transmitting station.

7. In a system for transmitting intelligence from a remotely spaced transmitting station to a central receiving station wherein a transmit signal is sent from said receiving station to said transmitting station, a transmitting station comprising a scanning means selectively operable to scan sequentially different categories of information, at least some of which are contained on selectable, preformed, coded information bearing means, means for selecting the categories of information to be scanned by said scanning means, means for transmitting a start signal from said transmitting station to said receiving station to notify the receiving station of readiness for transmitting and means responsive to a transmit signal from said receiving station for initiating the operation of said scanning means.

8. In a system for transmitting intelligence from a remotely spaced transmitting station to a central receiving station wherein a portion of the intelligence to be transmitted is contained on a plurality of selectable, preformed, coded information bearing means and wherein a transmit signal is sent from said receiving station to said transmitting station, a transmitting station comprising a scanning means adapted to have at least one of said preformed, coded information bearing means inserted therein and selectively operable to scan sequentially different categories of information, at least some of which are contained on said preformed, coded information bearing means, means for selecting the categories of information to be scanned by said scanning means, means for transmitting a start signal from said transmitting station to said receiving station to notify the receiving station of readiness for transmitting, means responsive to a transmit signal from said receiving station for initiating the operation of said scanning means, and means for preventing the insertion or removal of said preformed, coded information bearing means during the operation of said scanning means.

9. A system for transmitting intelligence from a plurality of remote transmitting stations to a receiving station comprising at each transmitting station means to transmit a start signal and means automatically to scan information bearing means in response to a transmit signal received from said receiving station, said system further comprising at said receiving station means responsive to receipt of a start signal to select the transmitting station transmitting such start signal and means responsive to such selection to send a transmit signal to such transmitting station.

10. In an automatic transaction information transmission system employing alpha-numeric coding, the combination comprising, a plurality of transaction transmitters, a transaction receiver, a plurality of conductors connecting each of said transmitters to said receiver; said receiver comprising search means for locating a transmitter which is ready to transmit upon receipt of a start signal from one of said transmitters, code distributor means adapted to be connected to the transmitter which has been located by said search means, further means for sending to said located transmitter a transmission initiating signal code recording means at said transaction receiver and connected to said code distributor for recording transmissions from said transmitters; said transmitters each comprising, means for storing alpha-numeric transmitter identifying information, means for accepting a plurality of alpha-numeric punch coded cards simultaneously, means for introducing alpha-numeric variable information into said transmitters, means for sending a start signal to said receiver after said punch coded cards and said variable information have been introduced into the transmitter, and transmitting means for sequentially transmitting the alpha-numeric characters of the punch coded information on said punch coded cards together with the alpha-numeric characters of said introduced variable information and said transmitter identifying information, one character at a time, upon receipt of said transmission initiating signal from said receiver, said sequential transmitting means adapted to transmit said alpha-numeric information to said receiver over a plurality of said connecting conductors, the units of each alpha-numeric character of said transmission being transmitted simultaneously over said plurality of conductors.

11. The information transmission system of claim 10 in which said receiver also comprises a time code generator adapted to add alpha-numeric time information to the transmissions received from said transmitters, said recording means adapted to record said time information as well as the transmissions received from said transmitters.

References Cited in the file of this patent

UNITED STATES PATENTS

| | | |
|---|---|---|
| 1,308,958 | McFell | July 8, 1919 |
| 1,955,043 | Yates | Apr. 17, 1934 |
| 2,152,535 | Collins | Mar. 28, 1939 |
| 2,357,297 | Wack | Sept. 5, 1944 |
| 2,458,030 | Rae | Jan. 4, 1949 |
| 2,504,999 | McWhirter | Apr. 25, 1950 |
| 2,591,617 | Savino | Apr. 1, 1952 |